United States Patent [19]

Scholl et al.

[11] Patent Number: 5,650,457
[45] Date of Patent: Jul. 22, 1997

[54] RUBBER MIXTURES INCORPORATING SULPHUR-CONTAINING ORGANOSILICON COMPOUNDS

[75] Inventors: Thomas Scholl, Bergisch Gladbach; Hermann-Josef Weidenhaupt, Nörvenich, both of Germany

[73] Assignee: Bayer AG, Leverkusen, Germany

[21] Appl. No.: 645,042

[22] Filed: May 6, 1996

Related U.S. Application Data

[63] Continuation of Ser. No. 427,620, Apr. 24, 1995, abandoned.

[30] Foreign Application Priority Data

May 4, 1994 [DE] Germany .................... 44 15 658.8

[51] Int. Cl.$^6$ .................................... C08K 5/24
[52] U.S. Cl. .................. 524/262; 524/267; 524/392; 524/393
[58] Field of Search .................... 524/262, 267, 524/392, 393

[56] References Cited

U.S. PATENT DOCUMENTS 3,873,489  3/1975  Thurn et al. .................. 260/33.6
4,229,333  10/1980  Wolff et al. .................. 260/23.7 M

OTHER PUBLICATIONS

Rubber Chemistry and Technology, 57:675–685 (1984).

*Primary Examiner*—Edward J. Cain
*Attorney, Agent, or Firm*—Connolly & Hutz

[57] ABSTRACT

The rubber mixtures according to the invention, containing at least one rubber, a vulcanizing agent, a filler, optionally other rubber additives and at least one reinforcing additive of the formula

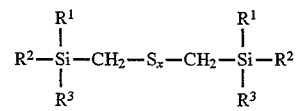

are used for the production of vulcanized rubbers, from which in particular tires can be produced having a low rolling resistance combined with a good wet skid resistance and a high abrasion resistance.

10 Claims, No Drawings

RUBBER MIXTURES INCORPORATING SULPHUR-CONTAINING ORGANOSILICON COMPOUNDS

This application is a continuation of application Ser. No. 08/427,620 filed on Apr. 24, 1995, now abandoned.

The present invention relates to rubber mixtures incorporating sulphur-containing organosilicon compounds and the use of the said rubber mixtures for the production of vulcanized rubber. The vulcanized rubbers according to the invention are suitable for the production of composites, in particular for the production of tires, which show a low rolling resistance combined with a good wet skid resistance and a high abrasion resistance.

Sulphur-containing organosilicon compounds which can be employed as reinforcing additives in the production of tires are known. Thus in DE-OS 2 141 159, 2 141 160 and 2 255 577 specific organosilanes are described as reinforcing additives particularly for vulcanized rubbers containing silica. The structures described in the examples are derived from trialkyloxysilylpropyl polysulphide. The representative compounds referred to in the text as being suitable begin with alkyl bridges, wherein alk represents —$CH_2CH_2$—. Methylene bridges are not however mentioned. Reinforcing additives based on organosilanes are also described in DE-OS 2 035 778. As in the patent applications already referred to, all the examples are derived from trialkylsilylpropyl starting materials. The alkyl bridges here are to be at least of the length —$CH_2CH_2CH_2$—. The disadvantage of these compounds is that the hysteresis losses are reduced not only at elevated temperatures (approximately 60° C.) but also at low temperatures (0° C.). It is known, however, that low hysteresis at low temperatures (0° to 20° C.) is correlated with a poor wet skid resistance in automobile tires.

The use of the said organosilanes based on trialkoxysilylpropyl polysulphide for the production of tires filled to a large extent with silica is also described in EP-A 447 066. The rolling resistance of the tire can be successfully lowered through the combination of a specific silane-modified rubber, silica filler and organo-silane. The representative compounds referred to in the text as being suitable begin with alkyl groups; alkyl signifies —$CH_2CH_2$—. No reference is made, however, to methylene bridges. It is apparent in this tire compound also that the said chemicals lower the hysteresis not only at elevated temperatures but also, disadvantageously, at low temperatures.

Surprisingly, it has now been found that the rubber mixtures according to the invention produce unexpectedly advantageous temperature-dependent hysteresis properties. In this they are superior to the rubber mixtures which contain silanes based on trialkylsilylpropyl polysulphide. This is apparent particularly in new, high-grade tread compounds based on solution SBR and filled with silica.

The present invention therefore provides rubber mixtures containing at least one rubber, a vulcanizing agent, a filler, optionally other rubber additives and at least one reinforcing additive of the formula

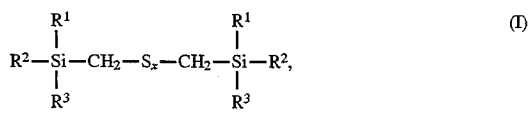
(I)

wherein $R^1$, $R^2$ and $R^3$ are identical or different and signify $C_1$–$C_{18}$ alkyl, $C_5$–$C_{18}$ cycloalkyl, $C_6$–$C_{18}$ aryl, $C_1$–$C_{12}$ alkoxy or phenoxy, provided that at least one of the radicals $R^1$, $R^2$ or $R^3$ represents an alkoxy or phenoxy group and x signifies an integer from 2 to 6, wherein the reinforcing additive is used in quantities of from 0.1 to 15% by weight, referred to the quantity of rubber used in each case.

The rubber mixtures according to the invention contain preferably from 0.1 to 10% by weight, particularly preferably from 1 to 7.5% by weight, of reinforcing additives.

The rubber mixtures according to the invention contain preferably those reinforcing additives of the above formula wherein $R^1$, $R^2$ and $R^3$ represent methyl, ethyl, n-propyl, isopropyl, n-butyl, amyl, cyclohexyl, n-octyl, 2-ethylhexyl, n-dodecyl, stearyl, phenyl, 4-methylphenyl, 4-tert.-butylphenyl, 4-nonylphenyl and x signifies an integer from 2 to 6.

Reinforcing additives corresponding to the formula given below are particularly preferred:

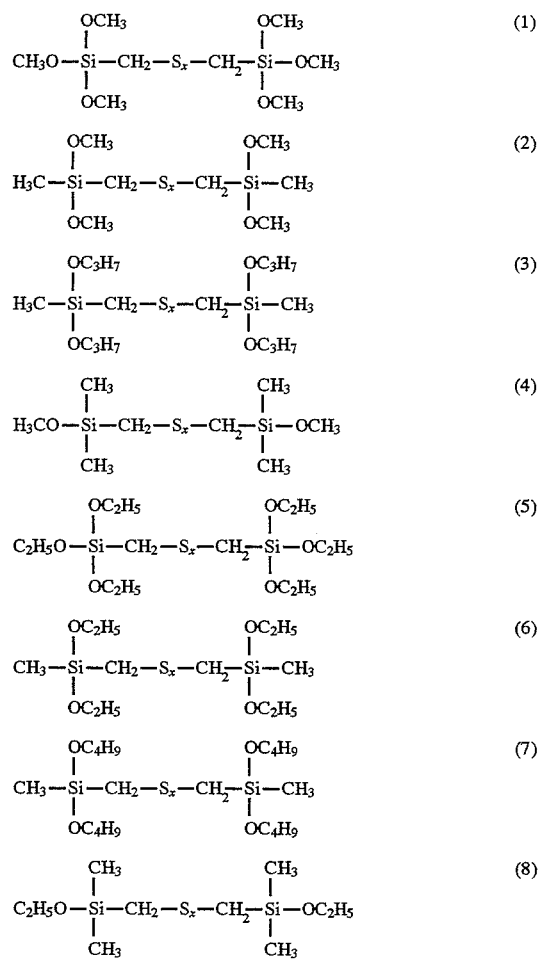

wherein x equals 2 to 6.

The reinforcing additives according to the invention can be used both individually and mixed with one another.

The preparation of the reinforcing additives according to the invention can be carried out in various ways:

A: By reaction of silanes which contain mercapto groups with sulphur dichloride or disulphur dichloride, accompanied by splitting off of hydrogen chloride. The reaction can be carried out in a manner known per se at temperatures of from −30 to +80° C., optionally in the presence of solvents such as alcohols or aromatic hydrocarbons:

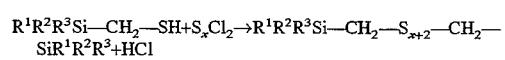

For information on the performance of the reaction, reference may be made to Houben-Weyl, Methoden der organischen Chemie, Volume 9, pages 88 ff. (1955) and Volume E 11 (1985), Thieme Verlag, Stuttgart.

B: The preparation of the reinforcing agents according to the invention is carried out particularly advantageously if haloalkylsilyl ethers and polyhalides are reacted with metallic polysulphides in the presence of alcoholic solvents at temperatures of from −20° to +90° C.:

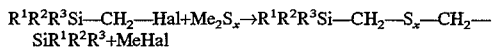

$R^1R^2R^3Si\text{—}CH_2\text{—}Hal+Me_2S_x \rightarrow R^1R^2R^3Si\text{—}CH_2\text{—}S_x\text{—}CH_2\text{—}SiR^1R^2R^3+MeHal$ The metallic polysulphides preferably used are those corresponding to the formula $Me_2S_x$, wherein Me represents lithium, sodium or potassium and x signifies a number between 2 and 6.

The solvents used are preferably alcohols such as methanol, ethanol, n-propanol, i-propanol, i-butanol, amyl alcohol, hexyl alcohol, n-octanol, i-octanol, ethylene glycol, 1,2- and 1,3-propylene glycol, 1,4-butanediol and/or 1,6-hexanediol.

The reinforcing additives according to the invention can be added to the rubber mixtures both in pure form and attached to an inert organic or inorganic carrier. Suitable carrier materials are in particular silicas, natural or synthetic silicates, aluminium oxide and carbon black.

The following are suitable fillers for the vulcanized rubbers according to the invention: highly dispersed silica prepared, for example, by precipitation of silicates from solvents or by flame hydrolysis of silicon halides having specific surfaces of from 5 to 1000 m²/g, preferably from 20 to 400 m²/g (BET surface) and initial particle sizes of from 100 to 400 nm. The silica powders may optionally also be present as mixed oxides together with other metal oxides such as the oxides of Al, Mg, Ca, Ba, Zn, Zr, Ti, synthetic silicates such as aluminium silicate, alkaline earth silicates such as magnesium silicate or calcium silicate, having BET surfaces of from 20 to 400 m²/g and initial particle sizes of from 10 to 400 nm, natural silicates, such as kaolin and other naturally occurring silicas, glass fibers and glass fiber products (fiber glass mat, filaments) or beads.

Preferably highly dispersed silicas, prepared by precipitation from solutions of silicates having BET surfaces of from 20 to 400 m²/g, in quantities of from 5 to 150 parts by weight, referred to 100 parts by weight of rubber, are used together with the reinforcing additives (I) according to the invention.

In addition, carbon blacks may be added to the said fillers. The carbon blacks to be used in this connection are prepared by the lampblack process, the furnace process or the thermal black process and have BET surfaces of from to 200 m²/g. Examples are SAF black, ISAF black, IISAF black, HAF black, FEF black or GPF black.

In a particularly preferred embodiment of the process, the vulcanized rubber is prepared using from 10 to 150 parts of light fillers (highly dispersed silica), optionally together with from 0 to 20 parts by weight of carbon black, and 1.5 to 10 parts by weight of reinforcing additives according to the invention (I), in each case referred to the rubber used, as well as other rubber additives.

The vulcanizing agents used for the rubber mixtures according to the invention are peroxides, sulphur, magnesium oxide and zinc oxide, to which may be added the known vulcanization accelerators such as mercaptobenzothiazole, mercaptosulphenamides, thiocarbamates and thiocarbonates. Both the vulcanization accelerator and the vulcanizing agent can be used individually or mixed with one another. Sulphur is particularly preferably used as the vulcanizing agent. The vulcanizing agent and the vulcanization accelerator are each used in quantities of from 0.1 to 10% by weight, preferably 0.1 to 5% by weight, referred to the rubber used in each case.

To the rubber mixtures according to the invention there may, of course, be added yet further rubber additives such as reaction accelerators, antioxidants, heat stabilizers, light stabilizers, antiozonants, processing agents, softeners, tackifiers, blowing agents, dyes, pigments, waxes, extenders, organic acids, reaction retardants, metal oxides as well as activators such as triethanolamine, polyethylene glycol, hexanetriol, all of which are familiar to the rubber expert.

The said rubber additives are employed in conventional quantities (from 0.1 to 30% by weight, referred to the rubber used in each case).

To prepare the rubber mixtures according to the invention, the foundation polymer used is preferably styrene-butadiene rubber having a styrene content of from 1 to 60% by weight, preferably 20 to 50% by weight (greater than 50% by weight of the total rubber content of the mixture), optionally blended with natural rubber and/or other synthetic rubbers. Examples of preferred synthetic rubbers are described in W. Hofmann, Kautschuktechnologie, Gentner Verlag, Stuttgart, 1980. They include i.a. polybutadiene (BR), butadiene-acrylic acid $C_{1-4}$ alkyl ester copolymer (ABR), polyisoprene (IR), isobutylene-isoprene copolymers (IIR) and ethylene-propylenediene copolymers (EPDM).

Particularly preferred rubbers are solution-SBR's with styrene content of 10–40% by weight and vinyl content of 25–75% and their blends with polybutadiene and natural rubber.

The preparation of the rubber mixtures according to the invention is carried out in a conventional manner in known mixing equipment such as rolls, kneaders and extruders, with mixtures at temperatures of from 100° to 200° C. and at shear rates of from 1 to 1000 sec⁻¹.

The reinforcing additives according to the invention as well as the fillers are added preferably during the first part of the mixing process, with mixtures at temperatures of from 100° to 200° C. and at the shear rates mentioned. But the addition can also take place subsequently at lower temperatures (from 4° to 100° C.), for example, together with the sulphur and vulcanization accelerators.

The rubber mixtures according to the invention can be vulcanized in the conventional manner. Here the vulcanization is carried out at temperatures of from approximately 100° to 200° C., preferably from 130° to 180° C., optionally at pressures of from 10 to 200 bar.

The vulcanized rubbers according to the invention are suitable in particular for the production of composites, particularly preferably for the production of tires.

EXAMPLES

Example 1

Preparation of $C_2H_5OSi(CH_3)_2\text{—}CH_2\text{—}S_4\text{—}CH_2\text{—}Si(CH_3)_2OC_2H_5$ 76 g (0.5 mol) of chloromethyldimethylethoxysilane is added to 43.5 g (0.25 mol) of $Na_2S_4$ in 300 ml of absolute ethanol at room temperature and the mixture is stirred for 14 h at room temperature. The precipitated NaCl is then removed by filtration and the filtrate is concentrated by evaporation under vacuum. 88 g of a yellow oil of low viscosity is obtained.

$^1$H-NMR (CDCl$_3$): 0.2 to 0.3 ppm (multiplet), 1.2 ppm (triplet), 2.2 to 2.6 ppm (multiplet), 3.6 to 3.8 ppm (quartet).

Example 2

Preparation of i—C$_3$H$_7$OSi(CH$_3$)$_2$—CH$_2$—S$_4$—CH$_2$Si(CH$_3$)$_2$OiC$_3$H$_7$ 81.8 g (0.5 mol) of chloromethyldimethylisopropoxysilane is added to 43.5 g (0.25 mol) of Na$_2$S$_4$ in 350 ml of absolute isopropanol at 60° C. The mixture is then stirred for 14 h at room temperature, the precipitated sodium chloride is removed by filtration and the residue is concentrated by evaporation under vacuum.

| Elemental analysis: | C | H | S | Si |
|---|---|---|---|---|
| Calcd.: | 36.9 | 7.7 | 32.8 | 14.4 |
| Found: | 37.0 | 7.5 | 32.5 | 14.4 |

$^1$H-NMR (CDCl$_3$): 0.2 ppm (multiplet), 1.2 ppm (doublet), 2.3 to 2.6 ppm (multiplet), 3.0 to 3.2 ppm (multiplet).

Example 3

Preparation of (C$_2$H$_5$O)$_2$CH$_3$Si—CH$_2$—S$_4$—CH$_2$—Si(CH$_3$) (OC$_2$H$_5$)$_2$ 59.5 g (0.25 mol) of Na$_2$S$_6$ is placed in 350 ml of absolute ethanol. 91 g (0.5 mol) of chloromethyldiethoxymethylsilane is then added dropwise at room temperature and the mixture is then stirred for 14 h at room temperature. 99 g of a yellow oil is obtained.

| Elemental analysis: | C | H | S | Si |
|---|---|---|---|---|
| Calcd.: | 34.1 | 7.1 | 30.3 | 13.3 |
| Found: | 34.6 | 7.2 | 29.6 | 12.9 |

$^1$H-NMR (CDCl$_3$): 0.2 ppm (multiplet), 1.2 to 1.3 ppm (triplet), 2.3 to 2.6 ppm (multiplet), 3.7 to 3.9 ppm (quartet).

Example 4

Preparation of (i—(C$_3$H$_7$O)$_2$CH$_3$Si—CH$_2$—S$_4$—CH$_2$—SiCH$_3$(O—i—C$_3$H$_7$)$_2$ 43.5 g (0.25 mol) of Na$_2$S$_4$ are placed in 350 ml of absolute isopropanol. 105.3 g (0.5 mol) of chloromethyldiisopropoxymethylsilane is then added dropwise at room temperature and the mixture is then stirred for 14 h at room temperature. 111 g of a light yellow oil of low viscosity is obtained.

| Elemental analysis: | C | H | S | Si |
|---|---|---|---|---|
| Calcd.: | 40.2 | 8.0 | 26.8 | 11.7 |
| Found: | 41.2 | 7.6 | 26.6 | 12.0 |

$^1$H-NMR (CDCl$_3$): 0.25 ppm (multiplet), 1.2 ppm (doublet), 2.3 to 2.7 ppm (multiplet), 4.1 to 4.3 ppm (multiplet).

Example 5

Preparation of (C$_2$H$_5$O)$_3$Si—CH$_2$—S$_4$—CH$_2$—Si(OC$_2$H$_5$)$_3$ 43.5 g (0.25 mol) of Na$_2$S$_4$ is placed in 275 ml of absolute ethanol. 106 g (0.5 mol) of chloromethyltriethoxysilane is then added dropwise at room temperature and the mixture is then stirred for 14 h at room temperature. 118 g of a light yellow oil of low viscosity is obtained.

$^1$H-NMR (CDCl$_3$): 1.2 to 1.3 ppm (triplet, 18 methyl protons), 2.4 to 2.7 ppm (multiplet, 4 CH$_2$ protons), 3.8 to 4.0 ppm (quartet, 12-OCH$_2$ protons).

Example 6

Test of the activity of the reinforcing agents according to the invention in vulcanized rubbers filled with SiO$_2$:

The following mixtures were prepared in a kneader at an internal temperature of 150° C. Sulphur and accelerator were mixed in subsequently on the roll at 50° C. To carry out the vulcanization, the mixtures were heated to 160° C. in heatable presses over a period of 30 minutes.

| | Comp 1 | Comp 2 | A | B | C | D |
|---|---|---|---|---|---|---|
| Formulation | | | | | | |
| SBR rubber (VSL 1950 S 25) | 96 | 96 | 96 | 96 | 96 | 96 |
| BR rubber (Buna CB 11) | 30 | 30 | 30 | 30 | 30 | 30 |
| Silica (Vulkasil S) | 80 | 80 | 80 | 80 | 80 | 80 |
| Steric acid | 1 | 1 | 1 | 1 | 1 | 1 |
| Zinc oxide | 2.5 | 2.5 | 2.5 | 2.5 | 2.5 | 2.5 |
| Carbon black Corax 3 | 6.5 | 6.5 | 6.5 | 6.5 | 6.5 | 6.5 |
| Arom. softener (Ingralen 450) | 8 | 8 | 8 | 8 | 8 | 8 |
| Oligomeric trimethylquinoline (Vulkonax HS) | 1 | 1 | 1 | 1 | 1 | 1 |
| N-isohexyl-N'-phenyl-p-phenylenediamine (Vulkanox 4020) | 1 | 1 | 1 | 1 | 1 | 1 |
| Antiozonant wax (Antilux 654) | 1.5 | 1.5 | 1.5 | 1.5 | 1.5 | 1.5 |
| Bis-triethoxysilylpropyl tetrasulphide acc. to DE-OS 2 255 579, identical with silane 1 of EP-A 447 066 | 6.5 | — | — | — | — | — |
| 3-(triethoxysilyl)propyl dithiobenzothiazole analogous | — | 6.5 | — | — | — | — |

-continued

|                                                      | Comp 1 | Comp 2 | A     | B     | C     | D     |
|------------------------------------------------------|--------|--------|-------|-------|-------|-------|
| to silane 2 of EP-A 447 066                          |        |        |       |       |       |       |
| Compound according to Eg. 1                          | —      | —      | 6.5   | —     | —     | —     |
| Compound according to Eg. 2                          | —      | —      | —     | 6.5   | —     | —     |
| Compound according to Eg. 3                          | —      | —      | —     | —     | 6.5   | —     |
| Compound according to Eg. 4                          | —      | —      | —     | —     | —     | 6.5   |
| On the roll/50° C.: cyclohexylmercaptobenzo-thiazole sulphenamide | 1.5    | 1.5    | 1.5   | 1.5   | 1.5   | 1.5   |
| Diphenylguanidine                                    | 2      | 2      | 2     | 2     | 2     | 2     |
| Sulphur                                              | 1.5    | 1.5    | 1.5   | 1.5   | 1.5   | 1.5   |
| Cyclohexylthiophthalimide                            | 0.1    | 0.1    | 0.1   | 0.1   | 0.1   | 0.1   |
| Mechanical properties                                |        |        |       |       |       |       |
| Modulus 100 (MPa)                                    | 2.7    | 2.9    | 5.1   | 5.2   | 5.6   | 3.6   |
| Strength (MPa)                                       | 16.6   | 16.2   | 13.4  | 14.1  | 14.2  | 15.4  |
| Extensibility (%)                                    | 408    | 384    | 223   | 235   | 230   | 328   |
| Hardness (Shore A)                                   | 69     | 70     | 76    | 74    | 77    | 72    |
| Elasticity (70° C.)                                  | 50     | 51     | 56    | 58    | 56    | 54    |
| Abrasion (DIN 53 516)                                | 123    |        | 118   | 108   | 105   | 122   |
| tan delta (0° C.)                                    | 0.432  | 0.402  | 0.518 | 0.529 | 0.474 | 0.484 |
| tan delta (60° C.)                                   | 0.120  | 0.127  | 0.083 | 0.088 | 0.091 | 0.090 |

The tests show clearly that the compounds according to the invention are far more effective reinforcing fillers than are the comparison compounds. This is clear from the considerably increased moduli, hardnesses and elasticities. In particular the dynamic damping at 60° C. (measured as the loss factor tan delta at 60° C.), which is responsible for the rolling resistance of a tire, is considerably lowered. It is all the more surprising that the dynamic damping at 0° C. (measured as tan delta at 0° C.), which is responsible for the wet skid resistance, is considerably higher than in the two comparison examples.

We claim:

1. Rubber mixtures containing at least one solution SBR, a vulcanizing agent, a filler, optionally other rubber additives and at least one reinforcing additive of the formula

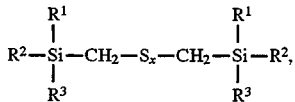

wherein $R^1$, $R^2$ and $R^3$, are identical or different and signify $C_1$–$C_{18}$ alkyl, $C_5$–$C_{18}$ cycloalkyl, $C_6$–$C_{18}$ aryl, $C_1$–$C_{12}$ alkoxy or phenoxy, provided that at least one of the radicals $R^1$, $R^2$ or $R^3$ represents an alkoxy or phenoxy group and x signifies an integer from 2 to 6, wherein the reinforcing additive is used in quantities of from 0.1 to 15% by weight, referred to the quantity of rubber used in each case.

2. The rubber mixture of claim 1 wherein, in the reinforcing additive of the formula (I), at least one but not more than two of the radicals $R^1$, $R^2$, and $R^3$ represents an alkoxy or phenoxy group.

3. The rubber mixture of claim 1, wherein the reinforcing additive of the formula (I) comprises one or more compounds (1)–(8) from the group consisting of:

$$\begin{array}{c} \text{OCH}_3 \\ | \\ \text{CH}_3\text{O}-\text{Si}-\text{CH}_2-\text{S}_x-\text{CH}_2-\text{Si}-\text{OCH}_3 \\ | \\ \text{OCH}_3 \end{array} \quad \begin{array}{c} \text{OCH}_3 \\ | \\ \\ | \\ \text{OCH}_3 \end{array} \quad (1)$$

-continued $$\begin{array}{c} \text{OCH}_3 \\ | \\ \text{H}_3\text{C}-\text{Si}-\text{CH}_2-\text{S}_x-\text{CH}_2-\text{Si}-\text{CH}_3 \\ | \\ \text{OCH}_3 \end{array} \quad \begin{array}{c} \text{OCH}_3 \\ | \\ \\ | \\ \text{OCH}_3 \end{array} \quad (2)$$

$$\begin{array}{c} \text{OC}_3\text{H}_7 \\ | \\ \text{H}_3\text{C}-\text{Si}-\text{CH}_2-\text{S}_x-\text{CH}_2-\text{Si}-\text{CH}_3 \\ | \\ \text{OC}_3\text{H}_7 \end{array} \quad \begin{array}{c} \text{OC}_3\text{H}_7 \\ | \\ \\ | \\ \text{OC}_3\text{H}_7 \end{array} \quad (3)$$

$$\begin{array}{c} \text{CH}_3 \\ | \\ \text{H}_3\text{CO}-\text{Si}-\text{CH}_2-\text{S}_x-\text{CH}_2-\text{Si}-\text{OCH}_3 \\ | \\ \text{CH}_3 \end{array} \quad \begin{array}{c} \text{CH}_3 \\ | \\ \\ | \\ \text{CH}_3 \end{array} \quad (4)$$

$$\begin{array}{c} \text{OC}_2\text{H}_5 \\ | \\ \text{C}_2\text{H}_5\text{O}-\text{Si}-\text{CH}_2-\text{S}_x-\text{CH}_2-\text{Si}-\text{OC}_2\text{H}_5 \\ | \\ \text{OC}_2\text{H}_5 \end{array} \quad \begin{array}{c} \text{OC}_2\text{H}_5 \\ | \\ \\ | \\ \text{OC}_2\text{H}_5 \end{array} \quad (5)$$

$$\begin{array}{c} \text{OC}_2\text{H}_5 \\ | \\ \text{CH}_3-\text{Si}-\text{CH}_2-\text{S}_x-\text{CH}_2-\text{Si}-\text{CH}_3 \\ | \\ \text{OC}_2\text{H}_5 \end{array} \quad \begin{array}{c} \text{OC}_2\text{H}_5 \\ | \\ \\ | \\ \text{OC}_2\text{H}_5 \end{array} \quad (6)$$

$$\begin{array}{c} \text{OC}_4\text{H}_9 \\ | \\ \text{CH}_3-\text{Si}-\text{CH}_2-\text{S}_x-\text{CH}_2-\text{Si}-\text{CH}_3 \\ | \\ \text{OC}_4\text{H}_9 \end{array} \quad \begin{array}{c} \text{OC}_4\text{H}_9 \\ | \\ \\ | \\ \text{OC}_4\text{H}_9 \end{array} \quad (7)$$

$$\begin{array}{c} \text{CH}_3 \\ | \\ \text{C}_2\text{H}_5\text{O}-\text{Si}-\text{CH}_2-\text{S}_x-\text{CH}_2-\text{Si}-\text{OC}_2\text{H}_5 \\ | \\ \text{CH}_3 \end{array} \quad \begin{array}{c} \text{CH}_3 \\ | \\ \\ | \\ \text{CH}_3 \end{array} \quad (8)$$

wherein x equals 2 to 6.

4. The rubber mixture of claim 1 which contains elemental sulfur.

5. A solution vulcanized rubber mixture consisting essentially of solution SBR, at least one reinforcing additive of the formula

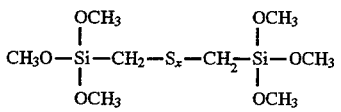

wherein
- (A) $R^1$, $R^2$ and $R^3$ are identical and signify $C_2$–$C_{12}$ alkoxy or phenoxy; or
- (B) $R^1$, $R^2$ and $R^3$ are different and signify $C_1$–$C_{18}$ alkyl, $C_5$–$C_{18}$ cycloalkyl, $C_6$–$C_{18}$ aryl, $C_1$–$C_{12}$ alkoxy or phenoxy, provided that at least one of the radicals $R^1$, $R^2$ or $R^3$ represents an alkoxy or phenoxy group; or
- (C) $R^1$ and $R^2$ are identical and $R^3$ is different from $R^1$ and $R^2$, and $R^1$, $R^2$ and $R^3$ are defined as in (B), provided that one of the radicals $R^1$ or $R^3$ represents an alkoxy or phenoxy group;

and wherein in each case x signifies an integer from 2 to 6;

and a vulcanizing agent and optionally rubber auxiliaries.

6. The rubber mixture of claim 5 which contains silica.

7. The rubber mixture of claim 5 which contains elemental sulfur.

8. The rubber mixture of claim 5, wherein the reinforcing additive of the formula (I) comprises one or more compounds from the group consisting of:

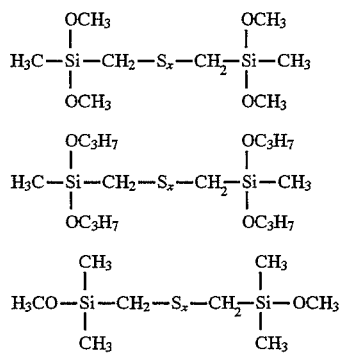

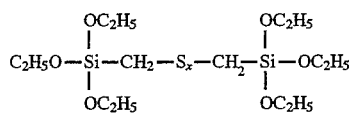

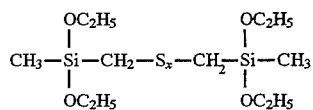

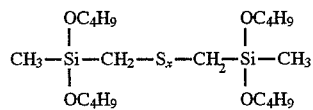

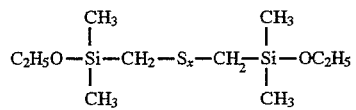

wherein in each formula x equals 2 to 6.

9. The rubber mixture of claim 1 wherein the solution SBR contains a styrene content ranging from about 10% to about 40% by weight and a vinyl content ranging from about 25% to about 75% by weight.

10. The rubber mixture of claim 7 wherein the solution SBR contains a styrene content ranging from about 10% to about 40% by weight and a vinyl content ranging from about 25% to about 75% by weight.

* * * * *